United States Patent [19]

Kawagishi et al.

[11] Patent Number: 4,788,485
[45] Date of Patent: Nov. 29, 1988

[54] APPARATUS FOR CONTROLLING ELECTRIC MOTOR

[75] Inventors: Kenshi Kawagishi; Masaharu Udaka, both of Hyogo, Japan

[73] Assignee: Mitsubishi Denki Kabushiki Kaisha, Tokyo, Japan

[21] Appl. No.: 29,228

[22] Filed: Mar. 23, 1987

[30] Foreign Application Priority Data

Mar. 24, 1986 [JP] Japan .................................. 61-65371

[51] Int. Cl.⁴ ............................................. H02P 5/28
[52] U.S. Cl. .................... 318/811; 318/807; 318/810; 363/37
[58] Field of Search ............... 318/729, 759, 803, 807, 318/811, 729, 759, 803, 807, 811, 798, 806, 799, 808, 810; 363/41, 37, 97, 98, 131, 132

[56] References Cited

U.S. PATENT DOCUMENTS

| 4,328,454 | 5/1982 | Okuyama et al. | |
| 4,420,718 | 12/1983 | Sakai et al. | 318/729 |
| 4,437,050 | 3/1984 | Overzet | 318/803 |
| 4,442,394 | 4/1984 | Beierholm et al. | 318/807 |
| 4,473,790 | 9/1984 | Plunkett et al. | 318/811 |
| 4,503,940 | 3/1985 | Watanabe | 318/759 |
| 4,615,000 | 9/1986 | Fujii et al. | 318/811 |
| 4,663,578 | 5/1987 | Iwasaki et al. | 318/811 |
| 4,678,980 | 7/1987 | Sugimoto et al. | 318/811 |

OTHER PUBLICATIONS

E. Ohno et al., Mitsubishi Electric Corp. "General Purpose Variable Frequency Inverter Using Integrated Power Modules and LSI", 1982, pp. 478–487.

Primary Examiner—William M. Shoop, Jr.
Assistant Examiner—Brian Young
Attorney, Agent, or Firm—Bernard, Rothwell & Brown

[57] ABSTRACT

A control apparatus for controlling the main circuit for driving an AC electric motor consisting of a diode converter and a pulse width modulation (PWM) power converting device, in which it is arranged that the DC current as the output of the diode converter is detected by a current detector, the AC component of this DC current is filtered through a high-pass filter, and a pulse-width-modulation control is exercised by a control circuit in response to the output of the high-pass filter so that the DC current as the output of the diode converter may be smoothed out in the main circuit by the PWM power converting device. By such arrangement, this control apparatus of an electric motor is made smaller in size and simplified in structure and enabled to control the power factor of the power source of the diode converter to close to 1.0.

7 Claims, 5 Drawing Sheets (a)

(b)

APPARATUS FOR CONTROLLING ELECTRIC MOTOR

BACKGROUND OF THE INVENTION

1. Field of the Invention

The present invention relates to an apparatus for controlling an electric motor and more particularly to an apparatus for controlling an electric motor adapted to achieve improvement of a power factor of a three phase alternating current power source by the use of a diode converter and an inverter of a pulse width modulation type.

2. Description of the Prior Art

It is generally known that an alternating current (hereinafter to be briefly called AC) electric motor may be driven controlled by a controlling apparatus which employs a pulse width modulation type inverter (hereinafter to be briefly called a PWM inverter). For example, since a voltage type PWM inverter itself has a function of voltage regulation, the magnitude of the output voltage can be varied by firing control of the inverter. Also, since the PWM inverter can control its output voltage instantaneously, its output current can be controlled to have a sinusoidal waveform.

As an example of the conventional apparatus for controlling an electric motor, there is one invented by Okuyama et al. and for which an application for a patent was filed in the Patent Office of Japan by Hitachi, Ltd. on Jan. 10, 1979. This invention was also the subject of an application for U.S. patent on Jan. 7, 1980 under the title of "APPARATUS FOR CONTROLLING AC MOTOR", with the right of priority claimed, the patent therefor being granted as U.S. Pat. No. 4,328,454. The prior art controlling apparatus is connected with a three-phase AC power source at one end and with a three-phase AC electric motor at the other end as shown in a schematic circuit diagram of FIG. 1.

Referring to the figure, reference numeral 1 denotes a three-phase AC power source, 2 denotes a first power converting device of a pulse wave modulation type, 3 denotes a three-phase AC electric motor such as an induction motor, 4 denotes a second power converting device of a pulse width modulation type, 5 denotes AC reactors whose group of terminals on one side are connected with the three-phase AC power source 1; the group of terminals of the AC reactors 5 on the other side are connected with the terminals on the AC side of the first power converting device 2. Reference numeral 6 denotes a DC smoothing capacitor, and this DC smoothing capacitor 6 is connected with terminals on the DC side of the first power converting device 2. This DC smoothing capacitor 6 is further connected to terminals on the DC side of the second power converting device 4, and terminals on the AC side of the second power converting device 4 are connected to the three-phase AC electric motor 3. Reference numeral 7 denotes a DC voltage instructing circuit outputting an instruction value of a reference voltage, 8 denotes a DC voltage detector for detecting the voltage across the above mentioned DC smoothing capacitor 6, 9 denotes a deviation amplifier for calculating deviation of the output of the DC voltage detector 8 from the output of the DC voltage instructing circuit 7 and amplifying and outputting the deviation, 10 denotes an insulated transformer for detecting the three-phase voltage of the three-phase AC power source 1, 11 denotes a current detector for detecting the three-phase AC current in the first power converting device 2, and 12 denotes an arithmetic unit making a calculation based on the output of the deviation amplifier 9, the output of the insulated transformer 10, and the output of the current detector 11 thereby to output an instruction signal for the three-phase voltage on the AC side of the first power converting device 2. Reference numeral 13 denotes a triangular wave generator, 14 denotes a comparator for comparing the output of the arithmetic unit 12 with the output of the triangular wave generator 13 thereby to output an ON/OFF signal for the switching element in the first power converting device 2, 15 denotes a gate amplifier circuit for amplifying the ON/OFF signal output from the comparator 14 thereby to ON/OFF control the gate turn off (GTO) thyristors as the switching element in the first power converting device 2.

On the other hand, 16 denotes a frequency instructing circuit for specifying the output frequency and voltage of the second power converting device 4, 17 denotes an oscillator for generating a three-phase sinusoidal wave signal of a variable frequency, 18 denotes a multiplier for multiplying together the output signals from the frequency instructing circuit 16 and the oscillator 17, 19 denotes a triangular wave generator, 20 denotes a comparator for comparing each output of the multiplier 18 with the output of the triangular wave generator 19 thereby to output an ON/OFF signal for the switching element in the second power converting device 4, and 21 denotes a gate amplifier circuit for amplifying the ON/OFF signal output from the comparator 20 thereby to ON/OFF control the switching element in the second power converting device 4.

The AC reactors 5, first power converting device 2, DC voltage instructing circuit 7, DC voltage detector 8, deviation amplifier 9, insulated transformer 10, current detector 11, arithmetic unit 12, triangular wave generator 13, comparator 14, and the gate amplifier circuit 15 put together will hereinafter be referred to as the power converting apparatus A.

Now, the operation will be described. The first power converting device 2 has a function of varying the relationship between magnitudes of the voltage on the AC side and the voltage on the DC side by the ON/OFF control of the switching element therein.

Firstly, the operation by which the above mentioned function can be obtained will be described. The DC voltage instruction $V_d^*$ delivered from the DC voltage instructing circuit 7 and the voltage $V_d$ on the DC smoothing capacitor 6 are input to the deviation amplifier 9 and the difference therebetween is amplified and output. This output becomes the instruction $i_d^*$ for the current $i_d$ on the DC side of the first power converting device 2. By making the direction of the current $i_d$ positive when it flows from the first power converting device 2 to the DC smoothing capacitor 6, the instruction $i_d^*$ is output to be positive when $V_d^* > V_d$ and negative when $V_d^* < V_d$.

The arithmetic unit 12 receives the supply of $i_d^*$, the output of the insulated transformer 10, and the output of the current detector 11 and calculates and delivers instructions $V_u^*$, $V_v^*$, and $V_w^*$ for the voltages on the AC side of the first power converting device 2. There being various ways to calculate and output those $V_u^*$, $V_v^*$, and $V_w^*$, one of them will be mentioned below.

The value $i_d^*$ is multiplied by each of $KV_R$, $KV_S$, and $KV_T$ which are proportional to the three-phase voltages $V_R$, $V_S$, and $V_T$ of the three-phase AC power source 1 output from the insulated transformer 10. As a result, $KV_R \cdot i_d^*$, $KV_S \cdot i_d^*$, and $KV_T \cdot i_d^*$ are obtained. These correspond to the AC current instructions $i_u^*$, $i_v^*$, and $u_w^*$ for the first power converting device 2. If the actual AC currents $i_u$, $i_v$, and $i_w$ coincide with $i_u^*$, $i_v^*$, and $i_w^*$, then these are in phase with or out of phase of $V_R$, $V_S$, and $V_T$ and hence the power factor of the power source becomes ±1. The values $i_u^*$, $i_v^*$, $i_w^*$, $i_u$, $I_v$, and $i_w$ are made positive when in the direction flowing from the three-phase AC power source 1 to the first power converting device 2. The values $V_u^*$, $V_v^*$, and $V_w^*$ are obtained by amplifying $(i_u^* - i_u)$, $(i_v^* - i_v)$, and $(i_w^* - i_w)$, respectively.

The mentioned values $V_u^*$, $V_v^*$, and $V_w^*$ are compared in the comparator 14 with a triangular wave generated by the triangular wave generator 13. The output from the comparator 14 is amplified in the gate amplifier circuit 15, and thereby, the switching element in the first power converting device 2 is ON/OFF controlled, when the phase voltages $V_u$, $V_v$, and $V_w$ on the AC side of the first power converting device 2 take pulse waveforms, but their fundamental waves agree with $V_u^*$, $V_v^*$, and $V_w^*$.

FIG. 2(a) shows a vector diagram of $V_R$, $V_u$, and $i_u$ when the when the power is supplied from the AC side to the DC side of the first power converting device 2 and FIG. 2(b) shows the same when the power is conversely supplied from the DC side to the AC side. It is adapted such that power of a variable voltage and variable frequency is supplied to the three-phase AC electric motor 3 by ON/OFF controlling of the switching element in the second power converting device 4 made by the gate amplifier circuit 21.

Since the apparatus for controlling an electric motor of the prior art was structured as described above, there was a problem that, when power conversion from a three-phase AC power source to a DC power supply was to be made, the first power converting device (converter) had to be provided with a converting device similar to that for driving the electric motor, i.e., the second power converting device (inverter), and besides, some detectors were required for detecting such values as the voltage phase and supply current on the AC power source side, and hence, the system as a whole became rather larger in size.

Incidentally, as the above described inverter, a general purpose inverter can be employed such as, for example, that described in the disclosure, "GENERAL PURPOSE VARIABLE FREQUENCY INVERTER USING INTEGRATED POWER MODULE AND LSI" submitted to IEEE by MITSUBISHI DENKI KABUSHIKI KAISHA (Mitsubishi Electric Corporation).

SUMMARY OF THE INVENTION

An object of the present invention is the provision of an apparatus for controlling an electric motor which will eliminate the need for various detectors to be provided on the AC power source side for detecting such values as voltage phase and source current, and will therefore enable the converter in the main circuit to be made smaller in size.

Another object of the present invention is the provision of an apparatus for controlling an electric motor which, in spite of its being of small size as described above, is capable of keeping the reactive power as low as possible, or more particularly, to keep $\cos \theta \approx 1$, where $\theta$ represents the angle of power factor, so that power loss in the AC power source may be minimized.

In order to achieve the above mentioned objects, the apparatus for controlling an electric motor of the present invention is provided in the main circuit for driving an electric motor constituted of a diode converter for converting three-phase AC power to DC power and a pulse width modulation type power converting device (a PWM inverter) connected to the DC output side of the diode converter for supplying driving power to the electric motor, whereby it is adapted such that the DC current supplied to the electric motor through the DC power supply line is detected with a current detector, the AC ripple portion contained in the DC current is extracted therefrom, and the PWM inverter as a constituent of the main circuit is PWM controlled in response to the AC ripples to smooth the mentioned DC current.

DETAILED DESCRIPTION OF THE PREFERRED EMBODIMENTS

Detailed description of a preferred embodiment of the present invention will be given in the following with reference to the accompanying drawings.

Figure 1:
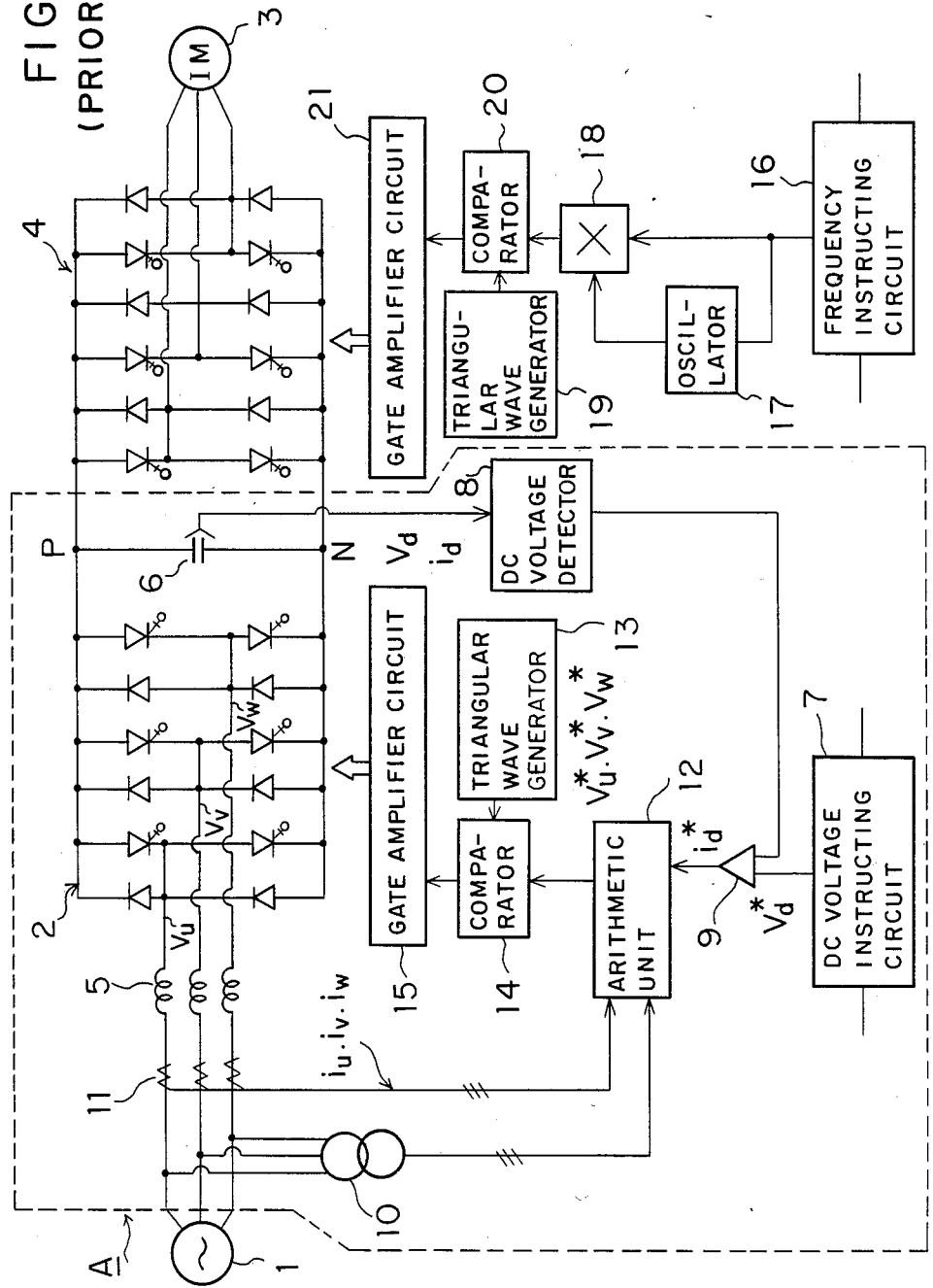
FIG. 1 is a block diagram showing circuit configuration of a prior art apparatus for controlling an electric motor.
Figure 2:
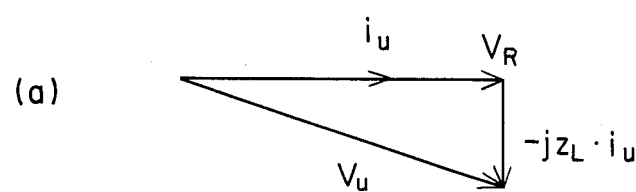
FIGS. 2(a) and 2(b) are explanatory drawings about operating conditions of the apparatus of FIG. 1.
Figure 2:
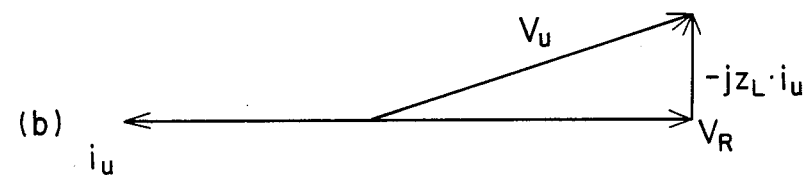
Figure 3:
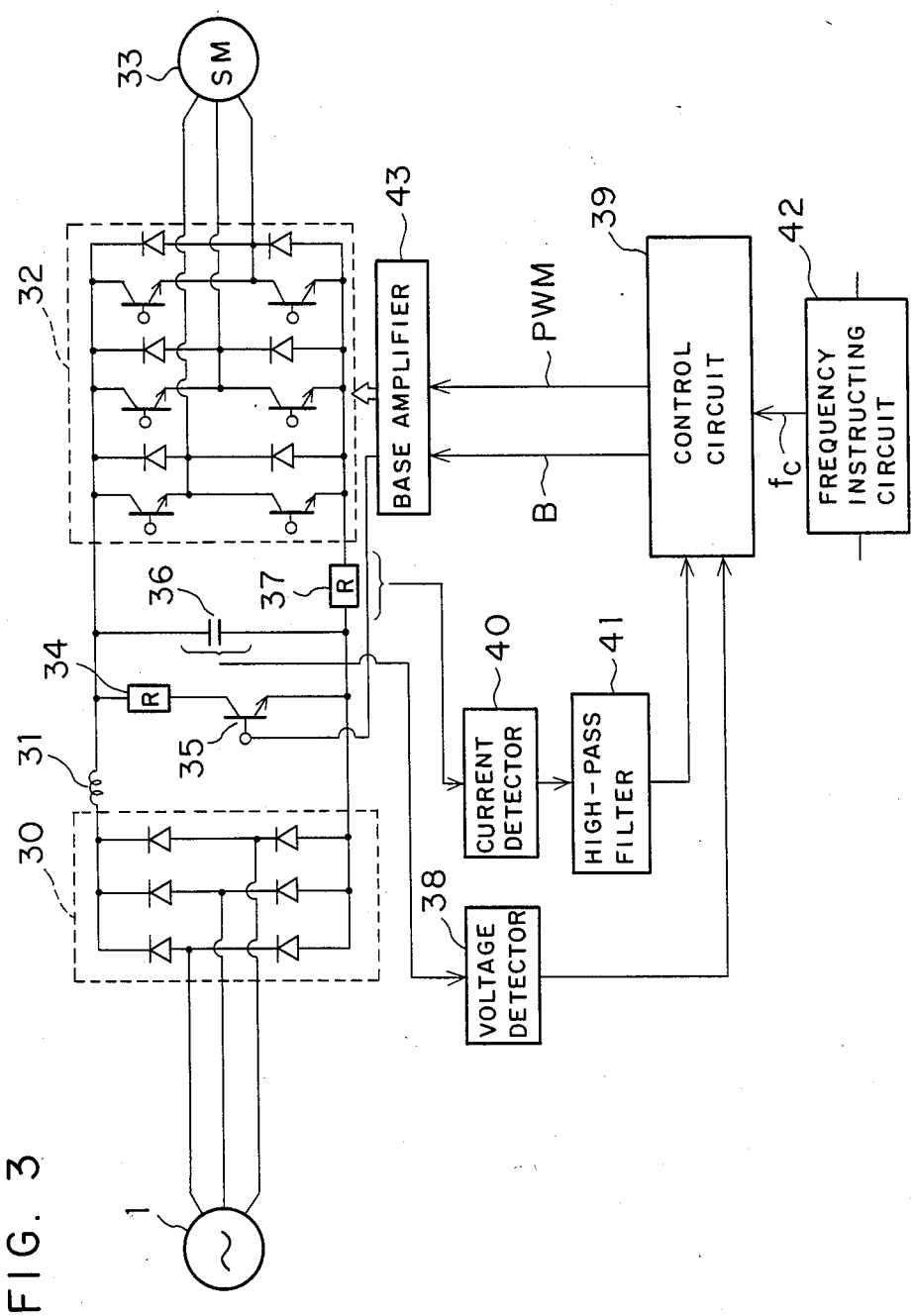
FIG. 3 is a block diagram showing circuit configuration of an apparatus for controlling an electric motor according to an embodiment of the present invention.

Referring to FIG. 3, reference numeral 1 denotes a three-phase AC power source, 30 denotes a three-phase diode converter, 31 denotes a DC reactor, 32 denotes a transistor inverter of a PWM type for driving a synchronous motor 33, 34 denotes a current limiting resistor, and 35 denotes a braking transistor, the mentioned current limiting resistor 34 and braking transistor 35 being put in a series connection and connected in parallel with a snubber capacitor 36, which is connected to the DC output side of the mentioned diode converter 30. Reference numeral 37 denotes a resistor for current detection, which is connected between the snubber capacitor 36 and synchronous motor 33 for detecting the DC current passing through the synchronous motor 33. Reference numeral 38 denotes a voltage detecting circuit, which detects the terminal voltage of the snubber capacitor 36 and inputs the detected value to a control circuit 39. The current detected by a current detecting circuit 40 with the resistor for current detection 37 is passed through a high-pass filter 41 and input to the control circuit 39. Reference numeral 42 denotes a frequency instructing circuit for generating a frequency instructing signal to be input to the control circuit 39 and 43 denotes a base amplifier, and this base amplifier 43 amplifies a PWM signal and a braking signal output from the control circuit 39 for driving each transistor inverter 32 and the braking transistor 35.

Figure 4:
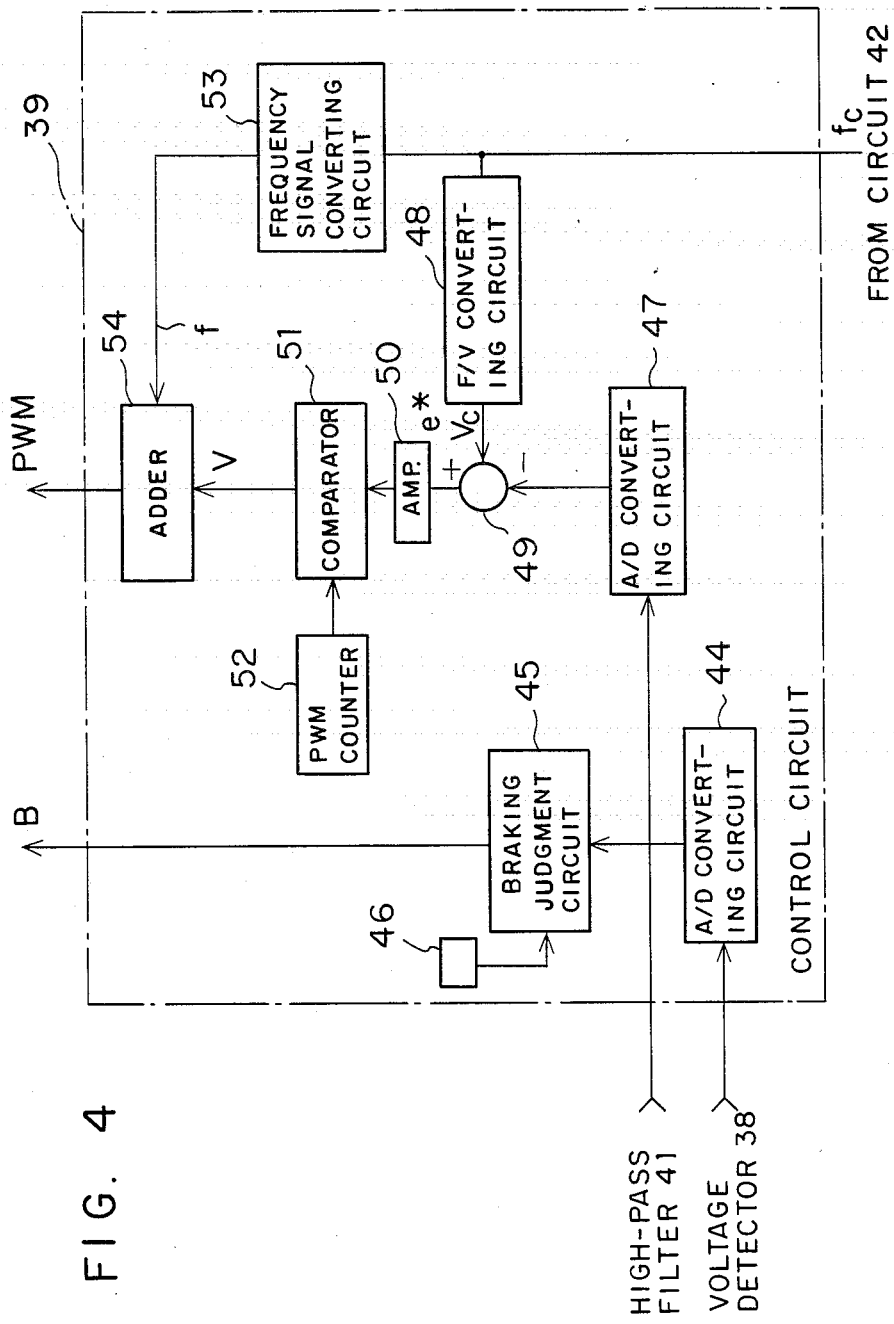
FIG. 4 is a schematic block diagram showing details of the control circuit as a constituent of the control apparatus of FIG. 3; and FIGS. (5(a) to 5(e) waveform diagram for explaining operations of the control apparatus of FIG. 3.

The control circuit 39 is constructed as shown in FIG. 4. Referring to the figure, numeral 44 denotes an A/D converting circuit for A/D converting the DC voltage, 45 denotes a braking judgment circuit for judging whether or not braking must be applied in accordance with a braking reference signal 46 and outputting a braking signal B based on the judgment, 47 denotes an A/D converting circuit for A/D converting the detected current, 48 denotes an F/V converting circuit for F/V converting the frequency instructing signal $f_c$, 49 denotes an adder as a deviation detector for calculating the deviation of the DC current value passing through the synchronous motor 33 from the voltage instructing signal $V_c$, 50 denotes an amplifier for amplifying the deviation signal e*, 51 denotes a comparator for comparing the output of a PWM counter 52 with the voltage-instructing deviation signal e*, 53 denotes a frequency signal converting circuit for converting the frequency instructing signal $f_c$ to a frequency instructing PWM signal f, and 54 denotes an adder for adding together the voltage instructing PWM signal V and frequency instructing PWM signal f and outputting the PWM signal to the base amplifier 43.

Now, the operation of the control circuit of an electric motor structured as above will be described with reference to FIG. 3 to FIG. 5.

Figure 5:
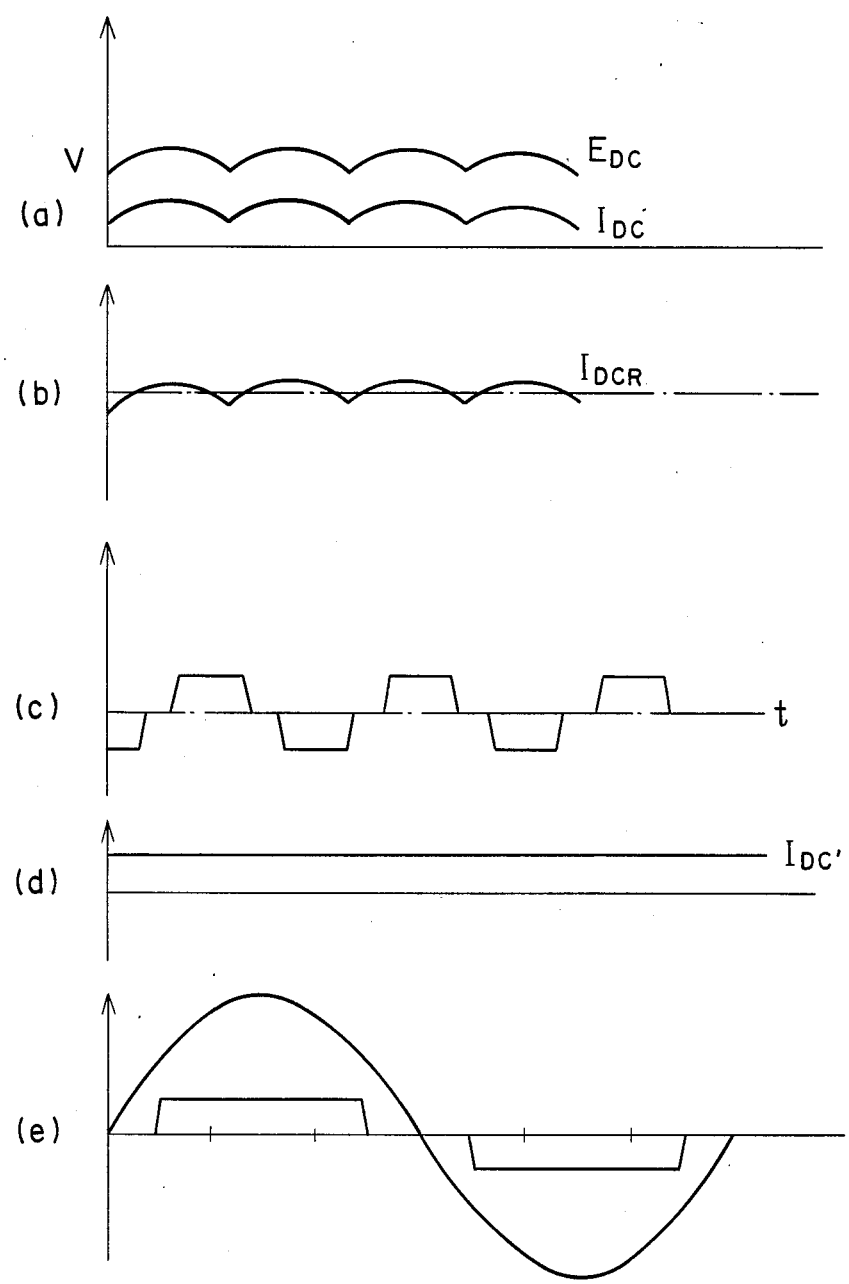

When the three-phase AC power 1 is rectified with the three-phase diode converter 30, the voltage on the DC output side of the diode converter 30 becomes a voltage pulsating at a frequency six times as large as the power source frequency as indicated by $E_{DC}$ in FIG. 5 (a) because the snubber capacitor 36 has not a sufficient capacity to smooth out the power source ripple voltages. If a six-step PWM system is adopted for driving the synchronous motor 33, and the power facto is kept to be virtually 1.0 and the effect of the ripple due to counter electromotive force is made little, then the DC current passing through the synchronous motor 33 becomes a current pulsating at six times the power source frequency like the supply voltage as indicated by $I_{DC}$ in FIG. 5(a). If the AC component of the DC current supplied from the diode converter 30 to pass through the synchronous motor 33 is filtered by the high-pass filter 41, the current will become as indicated in FIG. 5(b).

If the AC component in the DC current is input to the control circuit 39, and therein, the difference between the same and the voltage instructing signal $V_c$ is obtained, and this difference is amplified in the amplifier 50 to provide the PWM signal, the electric current loop operates so as to smooth out the DC current. Now, if the PWM transistor inverter 32 is arranged by a PWM inverter to which high frequency switching is applicable and the DC reactor 31 connected to the DC side is provided with such a parameter as to smooth out the pulsating current due to the carrier frequency of the PWM inverter, the DC currents passing through the resistor for current detection 37 becomes as indicated in FIG. 5(d).

Therefore, the phase current passing through the synchronous motor 33 becomes a six-stepped current free from the effect of the supply voltage ripples as indicated in FIG. 5(c). Further, since the supply current flow is kept at a constant magnitude throughout a 120° period as indicated in FIG. 5(e), the power factor of the power source can be kept very high.

The current limiting resistor 34 and the braking transistor 35 are provided, in view of the small capacity of the snubber capacitor 36, for suppressing the increase in voltage on the capacitor 36, when the energy of the synchronous motor 33 is regenerated, by consuming the generated energy.

Although the embodiment has been described above to be that using the PWM power converting device of a 120°-of-conducting-period type, the present invention is not limited to that. Instead of using the converting device of the above 120°-of-conducting-period type, a sinusoidal wave PWM inverter can also be used to obtain the same effect.

According to the present invention as described above, the electric motor control apparatus comprises a diode converter for converting three-phase AC power to DC power and a power converting device of a pulse width modulation type connected to the DC output side of the above diode converter for driving an electric motor, wherein the DC current passing through the electric motor is detected from the DC power supply line, AC ripples are extracted from the DC current, and the power converting device of the pulse width modulation type is pulse-width-modulated in accordance with the AC ripples so that the DC current passing through the electric motor is smoothed out. Therefore, it has become possible to eliminate the need for the various detectors for detecting such values as voltage phase and supply current, the smoothing capacitor, and so on, and it has also become possible to construct the entire driving apparatus including the main circuit in smaller size and simplified configuration.

Further, without using a smoothing capacitor, the apparatus can be kept free from the effect of variations in the power source voltage or of ripples produced through the rectification. As to the efficiency in connection with the power factor, the present apparatus can achieve the effect similar to or better than that of the conventional large-scaled apparatus.

What is claimed is:

1. In a control apparatus for controlling a driving main circuit consisting of a diode converter for converting AC power to DC power and a PWM power converting device connected to a DC output side of said diode converter for driving an AC electric motor, said apparatus for controlling an electric motor comprising;

a current detector for detecting a DC current converted by said diode converter to be supplied to said electric motor;

a high-pass filter for filtering therethrough an AC component of said DC current detected by said current detector;

a control circuit in response to an output of said high-pass filter for controlling said PWM power converting device in a pulse-width-modulating manner so that said converting device may convert said DC power into the power of a predetermined value for driving said electric motor;

said control circuit including:

an A/D converting circuit for analog-to-digital converting the output of said high-pass filter;

means providing frequency-to-voltage conversion of a frequency instructing signal to provide a voltage instructing signal;

means for determining the deviation of said voltage instructing signal from the output of said A/D converting circuit and amplifying said deviation to provide a deviation signals;

a PWM counter and a comparator for comparing the output of said PWM counter with said deviation signal to provide a voltage instructing PWM signal; and an adder for adding together a frequency instructing PWM signal provided in a frequency signal converting circuit by conversion of said frequency instructing signal and said voltage instructing PWM signal as the output of said comparator and for outputting the sum to said PWM power converting device.

2. An apparatus for controlling an electric motor according to claim 2, wherein said control circuit further includes:

a deviation detector connected between said A/D converting circuit and said comparator for detecting said deviation signal such as a differential value between said voltage instructing signal and said DC current value supplied to the electric motor as the output of said A/D converting circuit; and an amplifier connected between said deviation detector and said comparator for amplifying said deviation signal detected in said deviation detector.

3. An apparatus for controlling an electric motor according to claim 1, wherein a snubber capacitor connected between the DC output terminals of said diode converter and a voltage detector for detecting the terminal voltage of said snubber capacitor are provided between said diode converter of the main circuit and said control circuit, and wherein said control circuit includes an A/D converting circuit for analog-to-digital converting the DC voltage detected by said voltage detector and a braking judgment circuit for judging as to whether the DC current being supplied to said PWM power converting device is to be cut off or not based upon said digitized DC voltage value and a braking reference signal.

4. An apparatus for controlling an electric motor according to claim 1, wherein said current detector is connected with a resistor for current detection disposed between the DC output terminal of said diode converter and the input terminal of said PWM power converting device and adapted to detect the current supplied to the AC electric motor through said resistor.

5. An apparatus for controlling an electric motor according to claim 1, wherein a base amplifier is provided between said control circuit and said PWM converting device for amplifying a PWM signal output from said control circuit thereby to drive said PWM power converting device.

6. An apparatus for controlling an electric motor according to claim 5 structured so as to incorporate:

said base amplifier for amplifying a PWM signal as the output of said control circuit and supplying the signal to the transistors, which are for PWM inverter of a 120°-of-conducting-period type composing said PWM power converting device, for causing said transistors to make switching operations.

7. An apparatus for controlling an electric motor according to claim 5 structured so as to incorporate:

said base amplifier for amplifying a PWM signal as the output of said control circuit and supplying the signal to transistors, which are for the PWM inverter of a sinusoidal waveform type composing said PWM power converting device, for causing each transistor to make switching operations.

* * * * *

UNITED STATES PATENT AND TRADEMARK OFFICE
CERTIFICATE OF CORRECTION

PATENT NO. : 4,788,485
DATED      : November 29, 1988
INVENTOR(S): Kenshi Kawagishi et al.

It is certified that error appears in the above-identified patent and that said Letters Patent is hereby corrected as shown below:

Column 3, line 4, "$u_w^*$" should be --$i_w^*$--;

line 8, "$I_V$" should be --$i_V$--;

line 25, delete "when the" (second occurrence).

Column 4, line 28 should be a new paragraph beginning with "FIG. 4".

Column 5, line 32, "facto" should be --factor--.

Column 6, line 64, "signals" should be --signal--.

Signed and Sealed this

Thirty-first Day of October, 1989

*Attest:*

DONALD J. QUIGG

*Attesting Officer*        *Commissioner of Patents and Trademarks*